(12) United States Patent
Soda et al.

(10) Patent No.: US 9,029,467 B2
(45) Date of Patent: May 12, 2015

(54) RESIN COMPOSITION

(75) Inventors: Hiroyuki Soda, Funabashi (JP);
Takahiro Sakaguchi, Funabashi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 0 days.

(21) Appl. No.: 14/239,493

(22) PCT Filed: Aug. 27, 2012

(86) PCT No.: PCT/JP2012/071582
§ 371 (c)(1),
(2), (4) Date: Feb. 18, 2014

(87) PCT Pub. No.: WO2013/035569
PCT Pub. Date: Mar. 14, 2013

(65) Prior Publication Data
US 2014/0200304 A1  Jul. 17, 2014

(30) Foreign Application Priority Data

Sep. 5, 2011  (JP) ................................. 2011-192794

(51) Int. Cl.
*C08L 37/00* (2006.01)
*C08L 31/00* (2006.01)
*C09D 139/04* (2006.01)
*C08F 220/36* (2006.01)
*C08F 222/40* (2006.01)
*G02B 1/04* (2006.01)
*C09D 135/02* (2006.01)

(52) U.S. Cl.
CPC ............ *C09D 139/04* (2013.01); *C08F 220/36* (2013.01); *C08F 222/40* (2013.01); *G02B 1/04* (2013.01); *C09D 135/02* (2013.01); *C08L 2203/16* (2013.01); *G02B 1/041* (2013.01)

(58) Field of Classification Search
USPC ......................................................... 524/548
See application file for complete search history.

(56) References Cited

U.S. PATENT DOCUMENTS 7,847,003 B2 * 12/2010 Tsuji et al. ..................... 524/324
2008/0199637 A1 * 8/2008 Ushiyama et al. ........... 428/1.31

FOREIGN PATENT DOCUMENTS

| JP | A-64-10666 | 1/1989 |
| JP | A-6-112459 | 4/1994 |
| JP | A-2007-072412 | 3/2007 |
| JP | A-2007-169601 | 7/2007 |
| WO | WO 2012/073742 | 6/2012 |

OTHER PUBLICATIONS

Written Opinion issued in International Patent Application No. PCT/JP2012/071582 dated Oct. 23, 2012.
International Search Report issued in International Patent Application No. PCT/JP2012/071582 dated Oct. 23, 2012.

* cited by examiner

*Primary Examiner* — Hui Chin
(74) *Attorney, Agent, or Firm* — Oliff PLC

(57) ABSTRACT

There is provided a resin composition. A resin composition includes: a copolymer having structural units of the following Formula (1), Formula (2) and Formula (3):

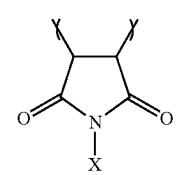

(1)

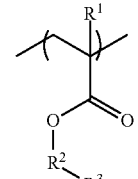

(2)

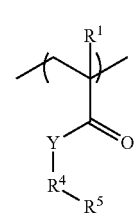

(3)

where X is a $C_{1-5}$ alkyl group, a $C_{5-6}$ cycloalkyl group, a phenyl group or a benzyl group, while the alkyl group, the cycloalkyl group, the phenyl group and the benzyl group optionally have a portion or all of the hydrogen atoms substituted with halogen atoms, carboxy groups, hydroxy groups, amino groups or nitro groups; each of $R^1$s is independently a hydrogen atom or a methyl group; $R^2$ is a single bond or a $C_{1-5}$ alkylene group; $R^3$ is a blocked isocyanate group; Y is an —O— group or an —NH— group; $R^4$ is a single bond or a $C_{1-5}$ alkylene group; and $R^5$ is a $C_{1-20}$ hydrocarbon group or a phenyl group having a hydroxy group as a substituent; and a solvent.

8 Claims, 1 Drawing Sheet

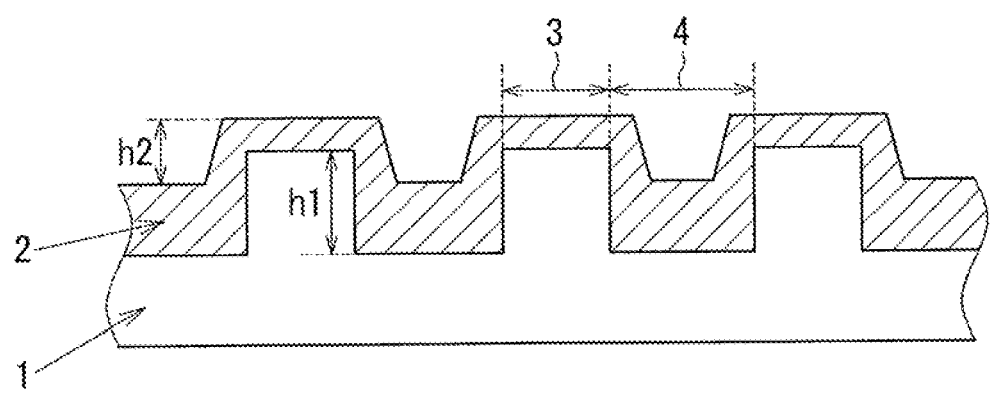

RESIN COMPOSITION

TECHNICAL FIELD

The present invention relates to a thermosetting resin composition, and a cured film, a microlens, and a planarizing film formed from the resin composition.

BACKGROUND ART

In recent years, development of higher definition CCD/CMOS image sensors is underway, and this requires the improvement in sensitivity of the sensors. Therefore, microlenses mounted on such sensors are required to have high transparency and high heat resistance.

A known method for producing a microlens for CCD/CMOS image sensors is an etch back method (Patent Document 1 and Patent Document 2). That is, a resist pattern is formed on a resin layer for a microlens formed on a color filter layer, and this resist pattern is heat-treated to cause reflow, thus forming a lens pattern. The lens pattern formed by allowing this resist pattern to reflow is used as an etching mask, and the resin layer for a microlens as the underlayer is subjected to etch back to transfer the lens pattern shape to the resin layer for a microlens. Thus, a microlens is produced.

In the etch back method, in order to transfer a lens pattern shape accurately to a resin layer for a microlens as the underlayer, it is required that the dry etching rate X of the resist and the dry etching rate Y of the resin layer for a microlens be substantially equal. In many cases, a resin containing a novolac resin is used as the resist. However, depending on the shape of the microlens and the evaluation environment, it may be required that the dry etching rate Y of the resin layer for a microlens be 1.3 times to 1.7 times the dry etching rate X of the resist containing a novolac resin (X:Y=1:1.3 to 1.7). Examples of such a case include a case in which a resist containing an acrylic resin, which has a larger dry etching rate than a resist containing a novolac resin, is used as the resist.

PRIOR ART DOCUMENTS

Patent Documents

Patent Document 1: Japanese Patent Application Publication No. 1-10666 (JP 1-10666 A)
Patent Document 2: Japanese patent Application Publication No. 6-112459 (JP6-112459A)

SUMMARY OF THE INVENTION

Problem to be Solved by the Invention

The present invention was devised in view of the above-described circumstances, and it is an object of the present invention to provide a thermosetting resin composition that has excellent storage stability and can form a cured film having excellent transparency, heat resistance, solvent resistance and flatness and having a dry etching rate of 1.3 times to 1.7 times the dry etching rate of a resist containing a novolac resin. It is another object of the present invention to provide a microlens having excellent transparency, heat resistance and solvent resistance.

Means for Solving the Problem

The inventors of the present invention conducted intensive studies in order to solve the problems described above, and as a result, the inventors finally completed the present invention.

That is, the present invention relates to the following:

According to a first aspect, there is provided a resin composition comprising a copolymer having structural units of the following Formula (1), Formula (2) and Formula (3), and a solvent:

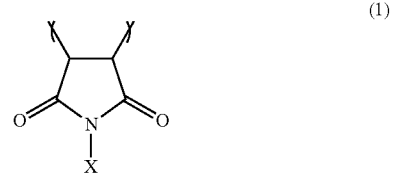

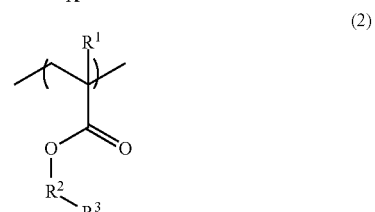

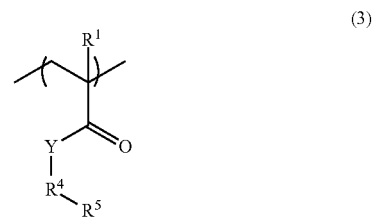

(where X is a $C_{1-5}$ alkyl group, a $C_{5-6}$ cycloalkyl group, a phenyl group or a benzyl group, while the alkyl group, the cycloalkyl group, the phenyl group and the benzyl group may have a portion or all of the hydrogen atoms substituted with halogen atoms, carboxy groups, hydroxy groups, amino groups or nitro groups; each of $R^1$'s is independently a hydrogen atom or a methyl group; $R^2$ is a single bond or a $C_{1-5}$ alkylene group; $R^3$ is a blocked isocyanate group; Y is an —O— group or an —NH— group; $R^4$ is a single bond or a $C_{1-5}$ alkylene group; and $R^5$ is a $C_{1-20}$ hydrocarbon group having a hydroxy group as a substituent, or a phenyl group having a hydroxy group as a substituent, while the $C_{1-20}$ hydrocarbon group is optionally linear, branched or cyclic).

According to a second aspect, there is provided the resin composition described in the first aspect, wherein the structural unit of Formula (2) is represented by the following Formula (2-1) or Formula (2-2):

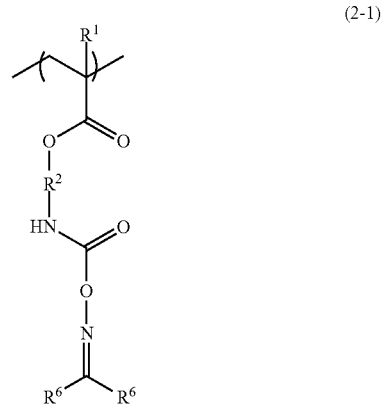

-continued

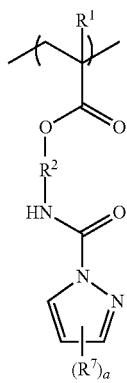

(2-2)

(where $R^1$ and $R^2$ are defined the same as in the first aspect; each of $R^6$s is independently a hydrogen atom, a methyl group or an ethyl group; $R^7$ is a methyl group; and a is an integer of 0 to 3).

According to a third aspect, there is provided the resin composition described in the first aspect, wherein the structural unit of Formula (3) is represented by the following Formula (3-1):

$$\underset{R^5}{\overset{R^1}{\bigg|}}$$ (3-1)

(where $R^1$, Y and $R^5$ are defined the same as in the first aspect).

According to a fourth aspect, there is provided the resin composition described in any one of the first aspect to the third aspect, wherein the weight average molecular weight of the copolymer is 1,000 to 50,000.

According to a fifth aspect, there is provided the resin composition described in any one of the first aspect to the fourth aspect, wherein the resin composition is used for a microlens.

According to a sixth aspect, there is provided the resin composition described in any one of the first aspect to the fourth aspect, wherein the resin composition is used for a planarizing film.

According to a seventh aspect, there is provided a cured film obtained from the resin composition described in any one of the first aspect to the sixth aspect.

According to an eighth aspect, there is provided a microlens produced from the resin composition described in the fifth aspect.

According to a ninth aspect, there is provided a planarizing film produced from the resin composition described in the sixth aspect.

Furthermore, the microlens produced from the resin composition in the present invention is produced by, for example, the etch back method described above.

Effects of the Invention

A composition of the present invention includes a self-crosslinkable type copolymer arising from structural units of Formula (2) having a blocked isocyanate group and Formula (3) having a hydroxy group. This eliminates the necessity of adding a crosslinking agent. Also, the isocyanate group in the structural unit of Formula (2) is blocked, so the resin composition of the present invention has excellent storage stability. Furthermore, a film formed from the resin composition of the present invention has excellent transparency, heat resistance, solvent resistance and flatness, and has a dry etching rate of 1.3 times to 1.7 times the dry etching rate of a resist containing a novolac resin.

On this account, the film formed from the resin composition of the present invention can markedly reduce the possibility that a microlens may be colored when subjected to a heating treatment at a high temperature, and the lens shape may be deformed, during a process for forming the film or a process for forming peripheral devices such as wiring. Furthermore, when a resin layer is formed from the resin composition of the present invention, and a resist is applied thereon, and when a microlens or a planarizing film is formed, and then a process of forming an electrode or wiring is carried out, the film formed from the resin composition of the present invention can also markedly reduce the problems concerning mixing with a resist, and deformation and detachment of the microlens or planarizing film caused by an organic solvent. Therefore, the resin composition of the present invention is suitable as a material for forming a microlens and a planarizing film.

BRIEF DESCRIPTION OF THE DRAWING

FIG. 1 is a schematic view showing a cured film formed by applying a resin composition of the present invention on a substrate having a level difference, and baking the resin composition.

MODES FOR CARRYING OUT THE INVENTION

The present invention is a resin composition comprising a copolymer and a solvent. Each component will be specifically described hereinafter. The solid content of the resin composition of the present invention except the solvent is typically 1% by mass to 50% by mass.

<Copolymer>

The copolymer included in the resin composition of the present invention is a copolymer having the structural units of Formula (1), Formula (2) and Formula (3).

Examples of the structural unit of Formula (1) include structural units of the following Formula (1-1), Formula (1-2) and Formula (1-3). The copolymer may have only one kind or two or more kinds of the structural units of Formula (1).

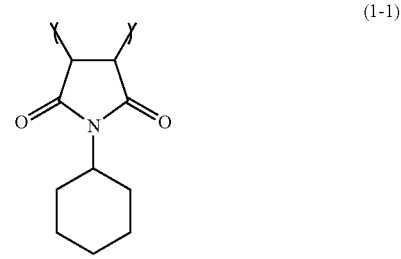

(1-1)

(1-2)

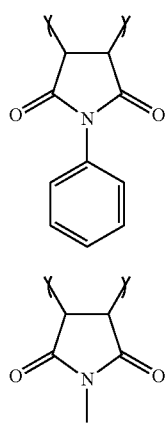

(1-3)

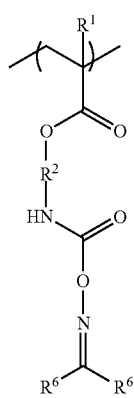

The structural unit of Formula (2) is formed from a (meth)acrylate having a blocked isocyanate group. The blocked isocyanate group means a group having an isocyanate group (—NCO) blocked with a protective group that can be released by heat, that is, a group obtained by allowing an isocyanate group to react with a blocking agent.

Examples of the blocking agent include alcohols such as methanol, ethanol, isopropanol, n-butanol, 2-ethoxyhexanol, 2-N,N-dimethylaminoethanol, 2-ethoxyethanol, and cyclohexanol; phenols such as phenol, o-nitrophenol, p-chlorophenol, o-cresol, m-cresol, and p-cresol; lactams such as ε-caprolactam; oximes such as acetone oxime, methyl ethyl ketone oxime, methyl isobutyl ketone oxime, cyclohexanone oxime, acetophenone oxime, and benzophenone oxime; pyrazoles such as pyrazole, 3,5-dimethylpyrazole, and 3-methylpyrazole; thiols such as dodecanethiol and benzenethiol; and active methylene compounds such as malonic acid diester, acetoacetic acid ester, malonic acid dinitrile, acetylacetone, methylene disulfone, dibenzoylmethane, dipivaloylmethane, and acetone dicarboxylic acid diester.

Specific examples of a compound (monomer) forming the structural unit of Formula (2) include compounds obtained by adding blocking agents such as methyl ethyl ketone oxime, ε-caprolactam, 3,5-dimethylpyrazole and diethyl malonate to isocyanate-containing (meth)acrylates such as 2-isocyanatoethyl methacrylate and 2-isocyanatoethyl acrylate. These compounds may be used singly or in combination of two or more of them.

The structural unit of Formula (2) is represented by, for example, the following Formula (2-1) or Formula (2-2):

(2-1)

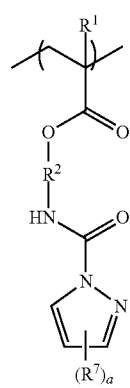

(2-2)

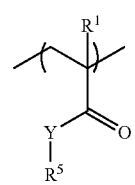

(where each of $R^1$s is independently a hydrogen atom or a methyl group; each of $R^2$s is independently a single bond or a $C_{1-5}$ alkylene group; each of two $R^6$s is independently a hydrogen atom, a methyl group or an ethyl group; $R^7$ is a methyl group; and a is an integer of 0 to 3).

Specific examples of a compound (monomer) forming the structural unit of Formula (3) include 2-hydroxyethyl(meth)acrylate, 2-hydroxypropyl(meth)acrylate, 2-hydroxybutyl(meth)acrylate, 3-hydroxy-1-adamantyl(meth)acrylate, 2,3-dihydroxypropyl(meth)acrylate, 3,5-dihydroxy-1-adamantyl(meth)acrylate, 4-hydroxyphenyl(meth)acrylate, 4-hydroxyphenylmethyl(meth)acrylate, N-(hydroxymethyl)(meth)acrylamide, N-(2-hydroxyethyl)(meth)acrylamide, N-(4-hydroxyphenyl)(meth)acrylamide, and N-(4-hydroxyphenylmethyl)(meth)acrylamide. These compounds may be used singly or in combination of two or more of them. Also, in the present specification, (meth)acrylate means methacrylate and acrylate, (meth)acrylamide means methacrylamide and acrylamide, and (meth)acrylic acid means acrylic acid and methacrylic acid.

The structural unit of Formula (3) is represented by, for example, the following Formula (3-1):

(3-1)

(where each of $R^1$s is independently a hydrogen atom or a methyl group; Y is an —O— group or an —NH— group; and $R^5$ is a $C_{1-20}$ hydrocarbon group having a hydroxy group as a substituent, or a phenyl group having a hydroxy group as a substituent, while the $C_{1-20}$ hydrocarbon group is optionally linear, branched or cyclic).

In a copolymer having the structural units of Formula (1), Formula (2) and Formula (3), the content of the structural unit of Formula (1) is 20 mol % to 90 mol %, and preferably 30 mol % to 80 mol %; the content of the structural unit of Formula (2) is 5 mol % to 75 mol %, and preferably 10 mol % to 60 mol %; and the content of the structural unit of Formula (3) is 5 mol % to 75 mol %, and preferably 10 mol % to 60 mol %, with respect to the total of 100 mol % of the structural unit of Formula (1), the structural unit of Formula (2) and the structural unit of Formula (3).

The weight average molecular weight of the copolymer is typically 1,000 to 50,000, and preferably 3,000 to 30,000. The weight average molecular weight is a value obtained by gel permeation chromatography (GPC), using polystyrene as a standard sample.

Furthermore, the content of the copolymer in the resin composition of the present invention is typically 1% by mass to 99% by mass, and preferably 5% by mass to 95% by mass, based on the solid content of the resin composition.

In the present invention, the method for preparing the copolymer is not particularly limited, but in general, the copolymer is typically obtained by subjecting compounds (monomers) forming the structural units of Formula (1), Formula (2), and Formula (3), and if desired, a compound other than the above compounds (hereinafter, simply referred to as compound X in the present specification), to a polymerization reaction in a solvent in the presence of a polymerization initiator, typically at a temperature of 50° C. to 120° C. The copolymer obtained in this manner is typically in a state of a solution having the copolymer dissolved in a solvent, and the solution may be used for the resin composition of the present invention without further isolation.

Alternatively, the copolymer solution obtained as described above may be poured to a poor solvent such as hexane, diethyl ether, methanol or water, with stirring to reprecipitate the copolymer, and the resulting precipitate may be filtered, washed, and then dried at ambient temperature or dried by heating at ambient pressure or under reduced pressure. Thus, the copolymer can be obtained as a powder. Such an operation can remove a polymerization initiator and unreacted compounds present together with the copolymer. In the present invention, the copolymer powder may be used without any treatment, or the powder may be used in a solution state by redissolving the powder in, for example, a solvent that will be described later.

Specific examples of the compound X include (meth) acrylic acid, methyl(meth)acrylate, ethyl(meth)acrylate, isopropyl(meth)acrylate, cyclohexyl(meth)acrylate, isobornyl (meth)acrylate, adamantyl(meth)acrylate, dicyclopentanyl (meth)acrylate, dicyclopentenyl(meth)acrylate, dicyclopentenyloxyethyl(meth)acrylate, benzyl(meth)acrylate, γ-butyrolactone(meth)acrylate, indene, 2-hydroxyethyl vinyl ether, 3-hydroxypropyl vinyl ether, 4-hydroxybutyl vinyl ether, 5-hydroxypentyl vinyl ether, 6-hydroxyhexyl vinyl ether, 4-hydroxycyclohexyl vinyl ether, 1,4-cyclohexanedimethanol monovinyl ether, diethylene glycol monovinyl ether, dipropylene glycol monovinyl ether, styrene, α-methylstyrene, 2-methylstyrene, 3-methylstyrene, 4-methylstyrene, 4-tert-butylstyrene, 4-methoxystyrene, 4-cyanostyrene, 4-vinylbenzoic acid, 4-vinylbiphenyl, 4-fluorostyrene, 4-chlorostyrene, and 4-bromostyrene.

The method for preparing the resin composition of the present invention is not particularly limited, and an example of the method is a method of dissolving the copolymer having the structural units of Formula (1), Formula (2), and Formula (3) in a solvent to afford a homogeneous solution. Another example is a method further including adding another additive, as necessary, and mixing the composition, at an appropriate step in the above-described preparation method.

The solvent is not particularly limited as long as the solvent is capable of dissolving the copolymer. Examples of such a solvent include ethylene glycol monomethyl ether, ethylene glycol monoethyl ether, methyl cellosolve acetate, ethyl cellosolve acetate, diethylene glycol monomethyl ether, diethylene glycol monoethyl ether, propylene glycol, propylene glycol monomethyl ether, propylene glycol monomethyl ether acetate, propylene glycol propyl ether acetate, propylene glycol monobutyl ether, propylene glycol monobutyl ether acetate, toluene, xylene, methyl ethyl ketone, cyclopentanone, cyclohexanone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropionate, ethyl 3-methoxypropionate, ethyl 3-ethoxypropionate, methyl 3-ethoxypropionate, methyl pyruvate, ethyl acetate, butyl acetate, ethyl lactate, butyl lactate, 2-heptanone, and γ-butyrolactone. These solvents may be used singly or in combination of two or more of them.

Among these solvents, propylene glycol monomethyl ether, propylene glycol monomethyl ether acetate, 2-heptanone, ethyl lactate, butyl lactate, and cyclohexanone are preferred from the viewpoint of improving the leveling properties of a coating formed by applying the resin composition of the present invention on a substrate.

The resin composition of the present invention may also contain a surfactant, for the purpose of improving coating properties.

Examples of the surfactant include: nonionic surfactants including polyoxyethylene alkyl ethers such as polyoxyethylene lauryl ether, polyoxyethylene stearyl ether, polyoxyethylene cetyl ether and polyoxyethylene oleyl ether, polyoxyethylene alkylaryl ethers such as polyoxyethylene octylphenyl ether and polyoxyethylene nonylphenyl ether, polyoxyethylene/polyoxypropylene block copolymers, sorbitan fatty acid esters such as sorbitan monolaurate, sorbitan monopalmitate, sorbitan monostearate, sorbitan monooleate, sorbitan trioleate and sorbitan tristearate, and polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan trioleate and polyoxyethylene sorbitan tristearate; fluorine-based surfactants including EFTOP [registered trademark] EF301, EFTOP EF303, EFTOP EF352 (manufactured by Mitsubishi Materials Electronic Chemicals Co., Ltd.), MEGAFAC [registered trademark] F-171. MEGAFAC F-173, MEGAFAC R-30 (manufactured by DIC Corporation). FLUORAD FC430, FLUORAD FC431 (manufactured by Sumitomo 3M), ASAHIGUARD [registered trademark] AG710, SURFLON [registered trademark] S-382. SURFLON SC101, SURFLON SC102, SURFLON SC103, SURFLON SC104, SURFLON SC105, SURFLON SC106 (manufactured by Asahi Glass Co., Ltd.), and FTERGENT series such as FTX-206D, FTX-212D, FTX-218, FTX-220D, FTX-230D, FTX-240D, FTX-221P, FTX-220P, FTX-228P, FTX-240G (manufactured by Neos Company Ltd.); and organosiloxane polymer KP341 (manufactured by Shin-Etsu Chemical Co., Ltd.). These surfactants may be used singly or in combination of two or more of them.

When the surfactants are used, the content of the surfactants in the resin composition of the present invention is 3% by mass or less, preferably 1% by mass or less, and more preferably 0.5% by mass or less, based on the solid content of the resin composition.

The resin composition of the present invention may contain additives such as a cross-linking agent, a curing aid, an ultraviolet absorber, a sensitizer, a plasticizer, an antioxidant, and an adhesion aid, as necessary, as long as the advantageous effect of the present invention is not impaired.

A usage example of the resin composition of the present invention will be described below.

On a substrate (for example, a semiconductor substrate such as a silicon substrate coated with a silicon oxide film, a semiconductor substrate such as a silicon substrate coated with a silicon nitride film or a silicon oxynitride film, a silicon nitride substrate, a quartz substrate, a glass substrate (including alkali-free glass, low-alkali glass, and crystallized glass), and a glass substrate with an ITO film formed thereon), the resin composition of the present invention is applied by an appropriate coating method such as a spinner and a coater, and then the resin composition is baked and cured using a heating means such as a hot plate to thus form a resin layer for a microlens.

The baking condition is appropriately selected from a baking temperature of 80° C. to 300° C. and a baking time of 0.3 minute to 60 minutes. The baking may be performed in two or more stages.

A film formed from the resin composition of the present invention has a film thickness of, for example, 0.005 μm to 5.0 μm and preferably 0.01 μm to 3.0 μm.

Thereafter, a resist is applied on the resin layer for a microlens formed from the resin composition of the present invention, and the resist is exposed through a predetermined mask. Post-exposure baking (PEB) is carried out as necessary, and the substrate is subjected to alkali development, rinsing, and drying, whereby a predetermined resist pattern is formed. For the exposure, for example, g-line, i-line, or a KrF excimer laser can be used.

Subsequently, the resist pattern is allowed to reflow by heat treating the pattern, and thus a lens pattern is formed. This lens pattern is used as an etching mask to etch-back the resin layer for a microlens as the underlayer, and the lens pattern shape is transferred to the resin layer for a microlens. Thus, a microlens is produced.

EXAMPLES

The present invention will be described in further detail with reference to Examples and Comparative Examples below, but the present invention is not intended to be limited to these Examples.

[Measurement of Weight Average Molecular Weight of Copolymers Obtained in Following Synthesis Examples]

Apparatus: CPC system manufactured by JASCO Corp.

Column: SHODEX [registered trademark] KL-804L and 803L

Column oven: 40° C.

Flow rate: 1 mL/min

Eluent: Tetrahydrofuran

Synthesis of Copolymers

Synthesis Example 1

20.0 g of N-cyclohexylmaleimide, 20.3 g of 2-(O-[1'-methylpropylideneamino]carboxyamino)ethyl methacrylate (KARENZ [registered trademark] MOI-BM (manufactured by Showa Denko K.K.)), 10.9 g of 2-hydroxyethyl methacrylate, and 1.5 g of 2,2'-azobisisobutyronitrile were dissolved in 97.9 g of propylene glycol monomethyl ether, and then this solution was added dropwise over 4 hours into a flask in which 25.1 g of propylene glycol monomethyl ether had been maintained at 70° C. After completion of the dropwise addition, the mixture was allowed to react for 18 hours, and thus a solution of a copolymer having a structural unit of the following Formula (4) (a solid content concentration of 30% by mass) was obtained. The weight average molecular weight Mw of the copolymer thus obtained was 11,000 (relative to polystyrene standards).

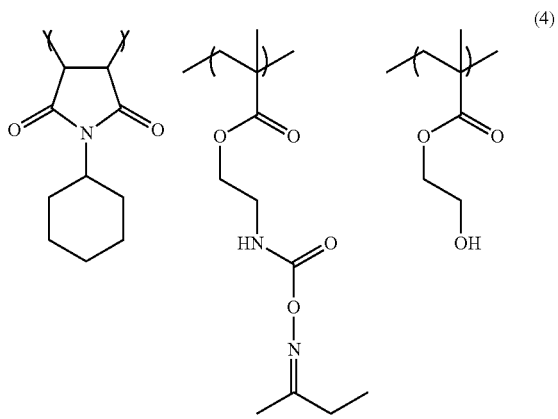

(4)

Synthesis Example 2

20.0 g of N-phenylmaleimide, 21.0 g of 2-(O-[1'-methylpropylideneamino]carboxyamino)ethyl methacrylate (KARENZ [registered trademark] MOI-BM (manufactured by Showa Denko K.K.)), 11.3 g of 2-hydroxyethyl methacrylate, and 1.6 g of 2,2'-azobisisobutyronitrile were dissolved in 100.0 g of propylene glycol monomethyl ether, and then this solution was added dropwise over 4 hours into a flask in which 25.6 g of propylene glycol monomethyl ether had been maintained at 70° C. After completion of the dropwise addition, the solution was allowed to react for 18 hours, and thus a solution of a copolymer having a structural unit of the following Formula (5) (a solid content concentration of 30% by mass) was obtained. The weight average molecular weight Mw of the copolymer thus obtained was 11.000 (relative to polystyrene standards).

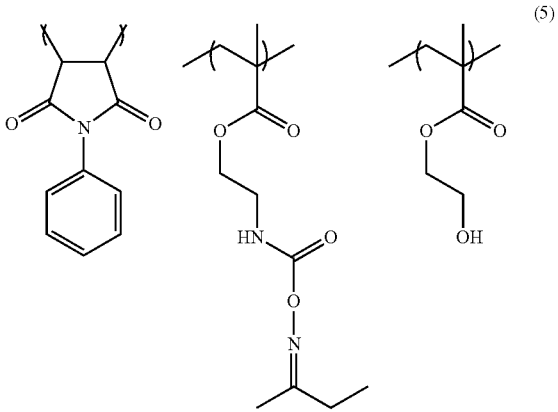

(5)

Synthesis Example 3

20.0 g of N-phenylmaleimide, 21.8 g of 2-[(3,5-dimethylpyrazolyl)carbonylamino]ethyl methacrylate (KARENZ [registered trademark] MOI-BP (manufactured by Showa Denko K.K.)), 12.5 g of 2-hydroxypropyl methacrylate, and 1.6 g of 2,2'-azobisisobutyronitrile were dissolved in 103.8 g of propylene glycol monomethyl ether, and then this solution was added dropwise over 4 hours into a flask in which 26.6 g of propylene glycol monomethyl ether had been maintained at 70° C. After completion of the dropwise addition, the mixture was allowed to react for 18 hours, and thus a solution of a copolymer having a structural unit of the following Formula (6) (a solid content concentration of 30% by mass) was obtained. The weight average molecular weight Mw of the copolymer thus obtained was 15,000 (relative to polystyrene standards).

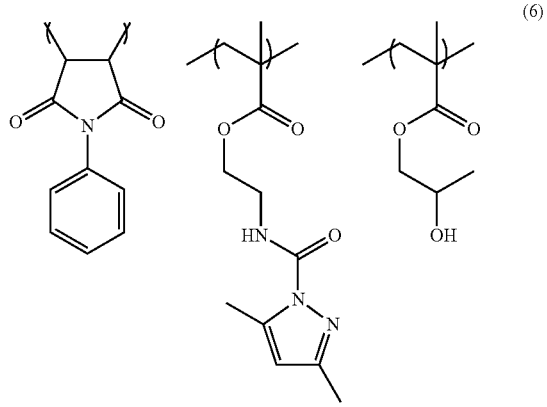

(6)

Synthesis Example 4

15.0 g of N-methylmaleimide, 24.5 g of 2-(O-[1'-methyl-propylideneamino]carboxyamino)ethyl methacrylate (KARENZ [registered trademark] MOI-BM (manufactured by Showa Denko K.K.)), 13.2 g of 2-hydroxyethyl methacrylate, and 1.6 g of 2,2'-azobisisobutyronitrile were dissolved in 100.8 g of propylene glycol monomethyl ether, and then this solution was added dropwise over 4 hours into a flask in which 25.9 g of propylene glycol monomethyl ether had been maintained at 75° C. After completion of the dropwise addition, the mixture was allowed to react for 18 hours, and thus a solution of a copolymer having a structural unit of the following Formula (7) (a solid content concentration of 30% by mass) was obtained. The weight average molecular weight Mw of the copolymer thus obtained was 9,000 (relative to polystyrene standards).

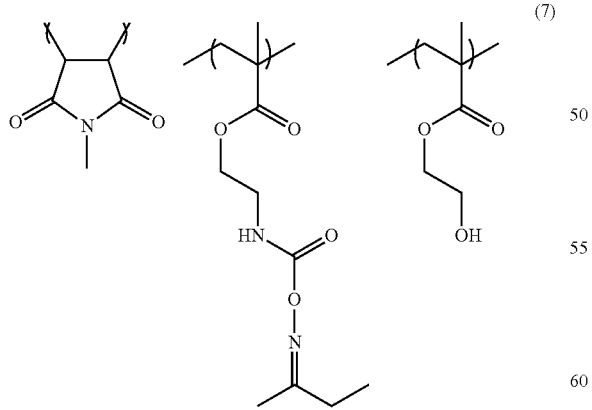

(7)

Synthesis Example 5

36.0 g of styrene, 11.2 g of 2-hydroxyethyl methacrylate, and 2.1 g of 2,2'-azobisisobutyronitrile were dissolved in 92.0 g of propylene glycol monomethyl ether, and then this solution was added dropwise over 4 hours into a flask in which 24.0 g of propylene glycol monomethyl ether had been maintained at 75° C. After completion of the dropwise addition, the mixture was allowed to react for 18 hours, and thus a solution of a copolymer having a structural unit of the following Formula (8) (a solid content concentration of 30% by mass) was obtained. The weight average molecular weight Mw of the copolymer thus obtained was 13,000 (relative to polystyrene standards).

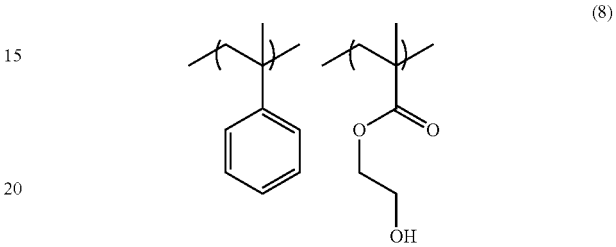

(8)

Synthesis Example 6

26.0 g of styrene, 25.9 g of 2-(O-[1'-methylpropylideneamino]carboxyamino)ethyl methacrylate (KARENZ [registered trademark] MOI-BM (manufactured by Showa Denko K.K.)), and 1.8 g of 2,2'-azobisisobutyronitrile were dissolved in 100.0 g of propylene glycol monomethyl ether acetate, and then this solution was added dropwise over 4 hours into a flask in which 25.6 g of propylene glycol monomethyl ether acetate had been maintained at 75° C. After completion of the dropwise addition, the mixture was allowed to react for 18 hours, and thus a solution of a copolymer having a structural unit of the following Formula (9) (a solid content concentration of 30% by mass) was obtained. The weight average molecular weight Mw of the copolymer thus obtained was 12,000 (relative to polystyrene standards).

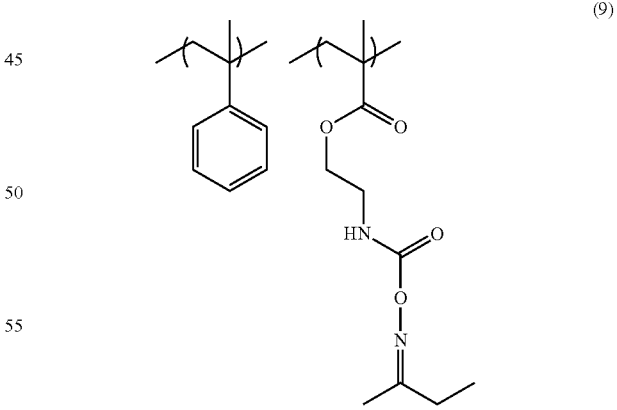

(9)

Synthesis Example 7

26.0 g of N-cyclohexylmaleimide, 28.3 g of 2-hydroxyethyl methacrylate, and 1.6 g of 2,2'-azobisisobutyronitrile were dissolved in 103.9 g of propylene glycol monomethyl ether, and then this solution was added dropwise over 4 hours into a flask in which 26.6 g of propylene glycol monomethyl ether had been maintained at 70° C. After completion of the dropwise addition, the mixture was allowed to react for 18 hours, and thus a solution of a copolymer having a structural unit of the following Formula (10) (a solid content concentration of 30%° by mass) was obtained. The weight average molecular weight Mw of the copolymer thus obtained was 11000 (relative to polystyrene standards).

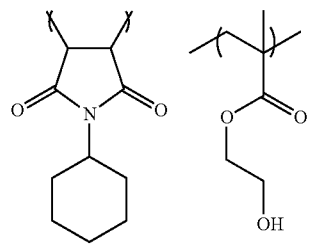

(10)

Synthesis Example 8

20.0 g of N-cyclohexylmaleimide, 40.6 g of 2-(O-[1'-methylpropylideneamino]carboxyamino)ethyl methacrylate (KARENZ [registered trademark] MOI-BM (manufactured by Showa Denko K.K.)), and 1.8 g of 2,2'-azobisisobutyronitrile were dissolved in 115.8 g of propylene glycol monomethyl ether acetate, and then this solution was added dropwise over 4 hours into a flask in which 29.7 g of propylene glycol monomethyl ether acetate had been maintained at 70° C. After completion of the dropwise addition, the mixture was allowed to react for 18 hours, and thus a solution of a copolymer having a structural unit of the following Formula (11) (a solid content concentration of 30% by mass) was obtained. The weight average molecular weight Mw of the copolymer thus obtained was 12,000 (relative to polystyrene standards).

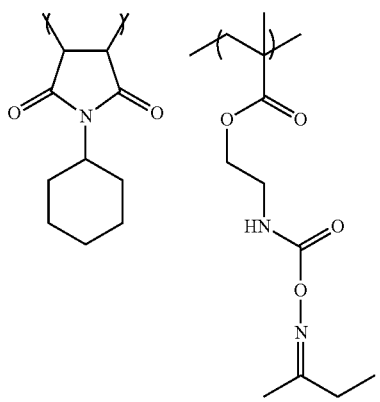

(11)

Preparation of Resin Compositions

Example 1

50.0 g of a solution of the copolymer obtained in Synthesis Example 1 and 0.03 g of MEGAFAC [registered trademark] R-30 (manufactured by DIC Corp.) as a surfactant were dissolved in 15.0 g of ethyl lactate to obtain a solution. Thereafter, the solution was filtered through a polyethylene microfilter having a pore size of 0.10 μm, and thus a resin composition was prepared.

Example 2

50.0 g of a solution of the copolymer obtained in Synthesis Example 2 and 0.03 g of MEGAFAC [registered trademark] R-30 (manufactured by DIC Corp.) as a surfactant were dissolved in 15.0 g of ethyl lactate to obtain a solution. Thereafter, the solution was filtered through a polyethylene microfilter having a pore size of 0.10 μm, and thus a resin composition was prepared.

Example 3

50.0 g of a solution of the copolymer obtained in Synthesis Example 3 and 0.03 g of MEGAFAC [registered trademark] R-30 (manufactured by DIC Corp.) as a surfactant were dissolved in 15.0 g of ethyl lactate to obtain a solution. Thereafter, the solution was filtered through a polyethylene microfilter having a pore size of 0.10 μm, and thus a resin composition was prepared.

Example 4

50.0 g of a solution of the copolymer obtained in Synthesis Example 4 and 0.03 g of MEGAFAC [registered trademark] R-30 (manufactured by DIC Corp.) as a surfactant were dissolved in 15.0 g of ethyl lactate to obtain a solution. Thereafter, the solution was filtered through a polyethylene microfilter having a pore size of 0.10 μm, and thus a resin composition was prepared.

Comparative Example 1

50.0 g of a solution of the copolymer obtained in Synthesis Example 5 and 0.03 g of MEGAFAC [registered trademark] R-30 (manufactured by DIC Corp.) as a surfactant were dissolved in 1.1 g of propylene glycol monomethyl ether and 9.0 g of propylene glycol monomethyl ether acetate to obtain a solution. Thereafter, the solution was filtered through a polyethylene microfilter having a pore size of 0.10 μm, and thus a resin composition was prepared.

Comparative Example 2

50.0 g of a solution of the copolymer obtained in Synthesis Example 6 and 0.03 g of MEGAFAC [registered trademark] R-30 (manufactured by DIC Corp.) as a surfactant were dissolved in 3.6 g of propylene glycol monomethyl ether acetate to obtain a solution. Thereafter, the solution was filtered through a polyethylene microfilter having a pore size of 0.10 μm, and thus a resin composition was prepared.

Comparative Example 3

50.0 g of a solution of the copolymer obtained in Synthesis Example 7 and 0.03 g of MEGAFAC [registered trademark] R-30 (manufactured by DIC Corp.) as a surfactant were dissolved in 1.1 g of propylene glycol monomethyl ether and 9.0 g of ethyl lactate to obtain a solution. Thereafter, the solution was filtered through a polyethylene microfilter having a pore size of 0.10 μm, and thus a resin composition was prepared.

Comparative Example 4

50.0 g of a solution of the copolymer obtained in Synthesis Example 8 and 0.03 g of MEGAFAC [registered trademark]

R-30 (manufactured by DIC Corp.) as a surfactant were dissolved in 3.6 g of propylene glycol monomethyl ether acetate to obtain a solution. Thereafter, the solution was filtered through a polyethylene microfilter having a pore size of 0.10 μm, and thus a resin composition was prepared.

[Solvent Resistance Test]

Each of the resin compositions prepared in Example 1 to Example 4 and Comparative Example 1 to Comparative Example 4 was applied on a silicon wafer using a spin coater, and was baked on a hot plate at 100° C. for 1 minute and then at 200° C. for 5 minutes. Thus, films having a film thickness of 2 μm were formed. These films were subjected to a test in which each of the films was immersed in propylene glycol monomethyl ether, propylene glycol monomethyl ether acetate, ethyl lactate, ethyl 3-ethoxypropionate, acetone, 2-heptanone, 2-propanol, γ-butyrolactone and an aqueous solution of tetramethylammonium hydroxide (TMAH) at a concentration of 2.38% by mass under a temperature condition of 23° C. for 5 minutes. A change in the film thickness before and after the immersion was measured, and the solvent resistance was evaluated as follows: a film having a thickness increase/decrease of 5% or more relative to the film thickness before the immersion for at least one of the immersion solvents was evaluated as "x"; and a film having a thickness increase/decrease of less than 5% for all the solvents was evaluated as "○." Table 1 shows the evaluation results.

[Measurement of Transmittance]

Each of the resin compositions prepared in Example 1 to Example 4 was applied on a quartz substrate using a spin coater, and was baked on a hot plate at 100° C. for 1 minute and then at 200° C. for 5 minutes. Thus, films having a film thickness of 2 μm were formed. The transmittance of each of these films was measured at a wavelength of 400 nm using an ultraviolet-visible spectrophotometer UV-2550 (manufactured by Shimadzu Corporation). The films were further heated at 260° C. for 5 minutes, and then the transmittance of the films at a wavelength 400 nm was measured. Table 1 shows the evaluation results.

[Measurement of Dry Etching Rate]

The dry etching rate was measured using an etcher and an etching gas described below:

Etcher: RIE-10NR (manufactured by Samco, Inc.)
Etching gas: $CF_4$

Each of the resin compositions prepared in Example 1 to Example 4 was applied on a silicon wafer using a spin coater, and was baked on a hot plate at 100° C. for 1 minute and then at 200° C. for 5 minutes. Thus, films having a film thickness of 2 μm were formed. The dry etching rate of each of these films was measured with the etcher and the etching gas described above. In a similar manner, a resist solution containing a novolac resin (THMR-iP1800 (manufactured by Tokyo Ohka Kogyo Co., Ltd.)) was applied on a silicon wafer using a spin coater, and was baked on a hot plate at 90° C. for 1.5 minutes, then at 110° C. for 1.5 minutes, and further at 180° C. for 1 minute. Thus, a resist film having a film thickness of 1 μm was formed, and the dry etching rate of the resist film was measured. Next, the ratio of the dry etching rate of the film obtained from each of the resin compositions prepared in Example 1 to Example 4 with respect to that of the resist film was calculated. Table 1 shows the evaluation results. The expression "98≤" described in Table 1 indicates that the transmittance is 98% or higher.

[Storage Stability]

Each of the resin compositions prepared in Example 1 to Example 4 was stored at 35° C. (acceleration test) for three weeks. A resin composition having a viscosity change of less than 10% relative to the viscosity measured immediately after preparation was evaluated as "○", and a resin composition having a viscosity change of 10% or more was evaluated as "x." Table 1 shows the evaluation results.

[Level Difference Planarization Performance]

Each of the resin compositions prepared in Example 1 to Example 4 was applied on a substrate having a level difference with a height of 0.5 μm, a line width of 30 μm, and a space between lines of 30 μm, using a spin coater, and was baked on a hot plate at 100° C. for 1 minute and then at 200° C. for 5 minutes. Thus, films having a film thickness of 2 μm were formed. From h1 (the level difference of the substrate having a level difference) and h2 (the film thickness difference of the cured film) shown in FIG. 1, the planarization ratio was calculated using "Equation: (1−(h2/h1))×100." Table 1 shows the evaluation results.

TABLE 1

|  | Solvent resistance | Transmittance/% (400 nm) 200° C. | Transmittance/% (400 nm) 260° C. | Ratio of dry etching rate (to resist) | Storage stability | Planarization ratio |
|---|---|---|---|---|---|---|
| Example 1 | ○ | 98≤ | 98≤ | 1.45 | ○ | 67% |
| Example 2 | ○ | 98≤ | 98≤ | 1.42 | ○ | 58% |
| Example 3 | ○ | 98≤ | 98≤ | 1.40 | ○ | 56% |
| Example 4 | ○ | 98≤ | 98≤ | 1.50 | ○ | 84% |
| Comparative Example 1 | X | — | — | — | — | — |
| Comparative Example 2 | X | — | — | — | — | — |
| Comparative Example 3 | X | — | — | — | — | — |
| Comparative Example 4 | X | — | — | — | — | — |

The results in Table 1 show that the films formed from the resin compositions of the present invention each had high solvent resistance and high transparency as well as such high heat resistance that the film was not colored even after heated at 260° C. Furthermore, each of the films yielded an intended dry etching rate (the dry etching rate X of the resist and the dry etching rate Y of the resin layer for a microlens are such that X:Y=1:1.3 to 1.7). Furthermore, the resin composition of the present invention was also found to have excellent storage stability. Films formed from the resin compositions of the present invention all had level difference planarization performance that gave a planarization ratio of 50% or more. Among them, the film formed from the resin composition prepared in Example 4 had excellent level difference planarization performance of a planarization ratio of 80% or more. In contrast, the results showed that the films formed from the resin compositions prepared in Comparative Example 1 to Comparative Example 4 had unsatisfactory solvent resistance and were not suitable for a microlens or a planarizing film.

DESCRIPTION OF THE REFERENCE NUMERALS

1: substrate having a level difference
2: cured film
3: line width
4: space between lines
h1: level difference of a substrate having a level difference
h2: film thickness difference of a cured film

The invention claimed is:

1. A resin composition comprising:
a copolymer having structural units of the following Formula (1), Formula (2) and Formula (3):

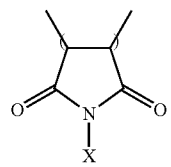
(1)

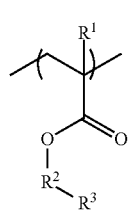
(2)

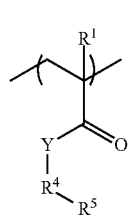
(3)

wherein the structural unit of Formula (2) is represented by the following Formula (2-1) or Formula (2-2):

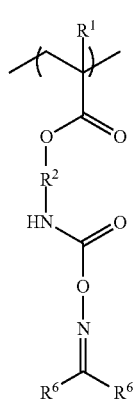
(2-1)

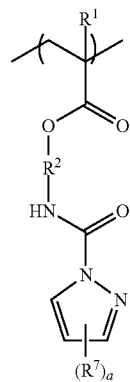
(2-2)

where X is a $C_{1-5}$ alkyl group, a $C_{5-6}$ cycloalkyl group, a phenyl group or a benzyl group, while the alkyl group, the cycloalkyl group, the phenyl group and the benzyl group optionally have a portion or all of the hydrogen atoms substituted with halogen atoms, carboxy groups, hydroxy groups, amino groups or nitro groups; each of $R^1$s is independently a hydrogen atom or a methyl group; $R^2$ is a single bond or a $C_{1-5}$ alkylene group; $R^3$ is a blocked isocyanate group; Y is an —O— group or an —NH— group; $R^4$ is a single bond or a $C_{1-5}$ alkylene group; $R^5$ is a $C_{1-20}$ hydrocarbon group having a hydroxy group as a substituent, or a phenyl group having a hydroxy group as a substituent, while the $C_{1-20}$ hydrocarbon group is optionally linear, branched or cyclic; each of $R^6$s is independently a hydrogen atom, a methyl group or an ethyl group; $R^7$ is a methyl group; and a is an integer of 0 to 3; and
a solvent.

2. The resin composition according to claim 1, wherein the structural unit of Formula (3) is represented by the following Formula (3-1):

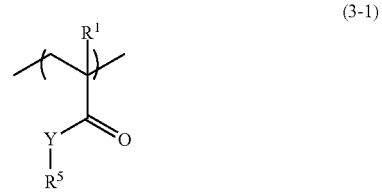
(3-1)

where $R^1$, Y and $R^5$ are defined the same as in claim 1.

3. The resin composition according to claim 1, wherein the weight average molecular weight of the copolymer is 1,000 to 50,000.

4. The resin composition according to claim 1, wherein the resin composition is used for a microlens.

5. The resin composition according to claim 1, wherein the resin composition is used for a planarizing film.

6. A cured film obtained from the resin composition according to claim 1.

7. A microlens produced from the resin composition according to claim 4.

8. A planarizing film produced from the resin composition according to claim 5.

* * * * *